US012611818B2

(12) United States Patent
Charmley

(10) Patent No.: US 12,611,818 B2
(45) Date of Patent: Apr. 28, 2026

(54) MECHANISM TO CONTROL THE DENSITY GRADIENT IN THREE-DIMENSIONALLY PRINTED MATERIAL

(71) Applicant: ARC Ventures LLC, St. Louis, MO (US)

(72) Inventor: James E. Charmley, St. Louis, MO (US)

(73) Assignee: ARC VENTURES LLC, St. Louis, MO (US)

( * ) Notice: Subject to any disclaimer, the term of this patent is extended or adjusted under 35 U.S.C. 154(b) by 123 days.

(21) Appl. No.: 18/765,151

(22) Filed: Jul. 5, 2024

(65) Prior Publication Data

US 2025/0010547 A1    Jan. 9, 2025

Related U.S. Application Data

(60) Provisional application No. 63/525,630, filed on Jul. 7, 2023.

(51) Int. Cl.
| | |
|---|---|
| *B29C 64/336* | (2017.01) |
| *B28B 1/00* | (2006.01) |
| *B29C 64/209* | (2017.01) |
| *B33Y 30/00* | (2015.01) |
| *B33Y 70/00* | (2020.01) |

(52) U.S. Cl.
CPC ............ *B29C 64/336* (2017.08); *B28B 1/001* (2013.01); *B29C 64/209* (2017.08); *B33Y 30/00* (2014.12); *B33Y 70/00* (2014.12)

(58) Field of Classification Search
CPC ..... B29C 64/336; B29C 64/209; B28B 1/001; B33Y 30/00; B33Y 70/00
See application file for complete search history.

(56) References Cited

U.S. PATENT DOCUMENTS

| | | | |
|---|---|---|---|
| 2,282,190 | A | 5/1942 | Joseph |
| 3,867,159 | A | 2/1975 | Ergene |
| 4,383,862 | A | 5/1983 | Dyson |
| 5,571,323 | A | 11/1996 | Duffy et al. |
| 7,153,454 | B2 | 12/2006 | Khoshnevis |
| 7,585,557 | B2 | 9/2009 | Aylward et al. |
| 7,874,825 | B2 | 1/2011 | Khoshnevis |
| 8,277,556 | B2 | 10/2012 | Berke et al. |

(Continued)

FOREIGN PATENT DOCUMENTS

| | | | |
|---|---|---|---|
| EP | 2886277 B1 | 12/2018 | |
| EP | 3957400 A1 * | 2/2022 | ............. B33Y 30/00 |

(Continued)

OTHER PUBLICATIONS

International Search Report and Written Opinion in PCT/US2024/036957, mailed Oct. 16, 2024, 9 pages.

*Primary Examiner* — JaMel M Nelson
*Assistant Examiner* — Erica Hartsell Funk
(74) *Attorney, Agent, or Firm* — Lewis Rice LLC

(57) ABSTRACT

Systems, methods and devices to create a wall system having a cross sectional density gradient obtained by structural 3D printing are disclosed. A mechanism is described that accepts a cementitious material and combines it with a gaseous bubble mixture and then partially mixes the various materials in such a controlled manner as to create a density gradient. The gaseous mixture may be primarily composed of carbon dioxide.

22 Claims, 4 Drawing Sheets

(56)                    References Cited

U.S. PATENT DOCUMENTS

| | | | |
|---|---|---|---|
| 9,028,607 | B2 | 5/2015 | Ramme |
| 10,074,449 | B2 | 9/2018 | White et al. |
| 10,335,991 | B2 | 7/2019 | Mandel et al. |
| 10,443,238 | B2 | 10/2019 | Ciuperca |
| 10,618,217 | B2 | 4/2020 | Boyd, IV et al. |
| 10,676,927 | B2 | 6/2020 | Mathieu |
| 11,020,925 | B2 | 6/2021 | Middlemiss |
| 11,176,663 | B2 | 11/2021 | Satish et al. |
| 2015/0008609 | A1 | 1/2015 | Nelson et al. |
| 2017/0348905 | A1 | 12/2017 | Fey |

FOREIGN PATENT DOCUMENTS

| | | | |
|---|---|---|---|
| JP | H11278959 | A | 10/1999 |
| KR | 1020030036284 | A | 5/2003 |
| KR | 100975644 | B1 | 8/2010 |
| KR | 101648764 | B1 | 8/2016 |
| WO | 2008130107 | A1 | 10/2008 |
| WO | 2022112380 | A1 | 6/2022 |

* cited by examiner

MECHANISM TO CONTROL THE DENSITY GRADIENT IN THREE-DIMENSIONALLY PRINTED MATERIAL

CROSS-REFERENCE TO RELATED APPLICATION(S)

This application claims the benefit of U.S. Provisional Application Ser. No. 63/525,630, filed on Jul. 7, 2023, the entire disclosure of which is herein incorporated by reference.

BACKGROUND OF INVENTION

Field of the Invention

This disclosure is related to the field of manufacturing lightweight concrete. In particular, it relates to 3D printing cementitious materials, and more particularly to the ability to create a variable density gradient throughout the cross section of a wall system which may also include the entrainment of carbon dioxide

Description of the Related Art

Lower density material is valuable for manufacturing and building lighter walls that have good insulative properties. One such material currently available is cellular concrete, also called aircrete or foam concrete. This foam concrete is a lightweight building material composed of a homogeneous mixture of cement, water, and a foaming agent. It contains a network of tiny air bubbles uniformly distributed throughout the mixture, which gives it a cellular or foam-like structure. Cellular concrete is used in multiple building applications including floors and panels as well as in load-bearing and non-load-bearing wall systems in residential and commercial buildings. When used on the interior of a wall system, cellular concrete offers multiple benefits such as thermal insulation, fire resistance, sound absorption, and increased workability.

Walls are often made with a uniform cellular foam slurry either poured into a mold or deposited between two higher density surface materials. For instance, in some existing manufacturing of lightweight walls, foam concrete is poured into wall system molds or formwork and left to cure and harden. The curing process allows the cement to hydrate and form a solid matrix that encapsulates the air bubbles. The resulting interior material has a low density, typically ranging from 400 kg/m³ (25 lb/ft³) to 1,800 kg/m³ (112 lb/ft³), making it significantly lighter than traditional concrete.

Benefits are obtained when the foam in cellular concrete is generated with carbon dioxide. In particular, carbon dioxide based foams tend to have smaller cells or bubbles that provide good stability and improved insulation properties. Furthermore, the carbon dioxide captured in the foam increases the carbonation process of concrete, particularly on the interior of the foamed structure. In concrete or cementitious structures, carbonation increases the formation of calcium carbonate, a crystalline structure that improves the compression strength of the overall material.

Naturally, concrete absorbs about 200 g of carbon dioxide per kilogram of cement over time. This reaction is primarily self-limited to the exposed surfaces of the concrete because the mineralization process expands the material slightly which blocks off additional carbon dioxide from making its way to the inner structure of a concrete wall. This essentially makes distinct layers of differing densities, based on where the carbon dioxide is exposed to and where it is blocked off from. Resultingly, existing wall systems can suffer either from poor bonding or delamination of differing materials, excess levels of lower density material layers, high levels of carbon dioxide too close to the wall surface, or suboptimal density gradients across a wall structure.

The existence of making types of foamed concrete has been known in the art for almost a century. For instance, in the 1930s inventors developed a method of making foamed concrete, often now known as aircrete or cellular concrete. One such method is described in U.S. Pat. No. 2,282,190 to Jahjah et al ("Jahjah"), which was filed in 1939 and published in 1942, the entire disclosure of which is herein incorporated by reference. Jahjah describes how to combine quantities of cement, surfactant, and accelerator with air to produce a lightweight, cementitious building material. Other approaches and improvements in lightweight concrete wall systems have developed over time.

In 1975, for example, U.S. Pat. No. 3,867,159 to Ergene ("Ergene") was granted. Ergene described foamed concrete structures made by mixing a cement and water combination with foam produced by a foam generator in. Additionally, in 2007, South Korean Patent No. KR100760039B1 was granted to Park ("Park"), which produced a uniform foam-only cement utilizing vegetable or animal fat as the foaming agent for use in a mold. Further, another U.S. Pat. No. 8,277,556 to Berke et al ("Berke"), describes how lightweight, cellular concrete may be created with a cementitious foam slurry which has a uniform lower density providing substantially improved insulation properties through the use of an expansion agent and a cross-linking agent. Berke details how a polycarboxylate surfactant, water based foam may be combined with a polyvinyl foam stabilizer, an accelerating and shrinkage-reducing admixture along with a fibrous mixture to create a strong, lightweight cementitious foam. In yet another patent, South Korean Patent No. KR100975644B1 to Jung ("Jung"), the inventor developed strong but lightweight concrete panels using expanded polystyrene beads containing graphite enabling a uniform looking wall surface. The entire disclosures of Ergene, Park, Berke, and Jung are herein incorporated by reference.

Apart from cementitious wall systems, other materials have also been developed using multiple layers of differing density, including a multi-layer polymer closed cell foam as noted in U.S. Pat. No. 7,585,557 to Aylward et al ("Aylward"). More recently, U.S. Pat. No. 10,443,238 to Ciuperca ("Ciuperca") showed how an aerated concrete roof section could be formed where the concrete and insulation are cast separately in a flat/horizontal position for later tilt-up. The entire disclosures of Aylward and Ciuperca are herein incorporated by reference.

Thus, various foamed cementitious systems are known in the art for a variety of applications and uses in the building and construction industries. Additionally, various structural 3D printing with concrete is known in the art as well.

Structural 3D printing is well established and as structural 3D printing with concrete has developed, cellular or lightweight concrete has been one of the materials used. In a patent granted in 2006 to Khoshnevis, U.S. Pat. No. 7,153, 454, for example, Khoshnevis described how multiple nozzles could be used to sequentially or simultaneously 3D print multiple materials of distinct densities including standard concrete mortars, plastic, and cellular foams. The Khoshnevis invention disclosed that 3D printing materials could be printed adjacent to each other noted as external 'rims' and internal 'filler' material. The materials may bond to each other or not, but are not designed to mix with each other. As an extension, Khoshnevis describes in another one of his patents, U.S. Pat. No. 7,874,825, how multiple nozzles can be automatically separated to make a wider wall while using another nozzle to create a rib-like center structure through oscillation of a separate printing nozzle. The entire disclosures of both of Khoshnevis patents referenced above are herein incorporated by reference.

Other 3D printed concrete inventions have disclosed differing methods of simultaneously or sequentially printing materials of differing densities, albeit all without a continuously varying density gradient across the entirety of the wall surface. In 2016, a South Korean patent to Kim, Patent No. KR101648764B1 ("Kim"), showed how a longitudinal nozzle with one or more movable partitions could be used to 3D print a multi-layered material where a different material is dispensed into each partition. Additionally, in 2019, U.S. Pat. No. 10,335,991 to Mandel et al ("Mandel") showed a multi-nozzle 3D printer that simultaneously prints different materials, one per nozzle. In yet another U.S. Patent to Boyd et al, U.S. Pat. No. 10,618,217 ("Boyd"), the disclosure showed how a multi-material nozzle allows free form 3D printing of a cellular matrix, typically made from extruded plastic, filled with either polystyrene or concrete mortar. The result, while likely having good insulating properties, does not require or allow the mixing of the lattice and the filler. In another U.S. Patent to Middlemiss, U.S. Pat. No. 11,020, 925 ("Middlemiss"), Middlemiss uses 3D printing and cementitious materials to print differing density layers sequentially. Furthermore, German Patent No. DE102016209933A1 to Fey ("Fey") covers 3D printing of two differing materials, generally in a sequential manner, but always with the materials remaining distinct after printing. The entire disclosures of Kim, Mandel, Boyd, Middlemiss, and Fey are herein incorporated by reference.

Differing materials, some with lower density, have also been included in cementitious wall systems. For instance, a patent issued in 2018 to White et al, U.S. Pat. No. 10,074, 449 ("White"), disclosed how to 3D print both a concrete material and a non-concrete material, such as one with electrical or radiation blocking characteristics, in a singular nozzle which may even mix in the nozzle to form a semi-heterogeneous mixture. While this mixing is mentioned in the patent, there is no mechanism described regarding how to mix the two materials nor how to control their concentration at differing points across the surface. Another patent issued in 2020, U.S. Pat. No. 10,676,927 to Mathieu ("Mathieu"), shows how a cementitious mixture with foam or polystyrene balls of various sizes may be poured with surfactant between two edge shells where the shells are typically made of a nonwoven fiber. The entire disclosures of White and Mathieu are herein incorporated by reference.

Most recently, in 2021, U.S. Pat. No. 11,176,663 to Cook et al ("Cook") expanded upon the 2006 Koshnevis patent by creating a device for three dimensional printing that sandwiches a separating layer in between each row of concrete. Typically made of Kevlar or another woven material, Cook calls for multiple nozzle outlets with mortar at the exterior edges and aircrete in the middle. A similar approach was documented in European Patent EP2886277B1 to Austin et al. ("Austin"). Both Cook and Austin are herein incorporated by reference.

The use and benefits of adding carbon dioxide to create lower density cementitious foams has also been described. In a 2015 patent to Ramme, U.S. Pat. No. 9,028,607 ("Ramme"), the ability to sequester carbon dioxide in a uniform cementitious foam was disclosed. Carbon dioxide is primarily captured, especially initially, in the bubbles formed as part of the foaming process. Over time, some of the entrained carbon dioxide aids in the carbonation or mineralization process in concrete. The Ramme invention built on previous known uses of carbon dioxide in making aerated concrete. For example, the benefits of using carbon dioxide to make aerated concrete were confirmed as early as 1983 by Dyson in U.S. Pat. No. 4,383,862A ("Dyson"). In expanding on the teachings of Dyson, Ramme showed that using carbon dioxide as the gaseous input to the process provides the added benefit of increasing hardness of the resultant material through enhanced carbonation over time.

The carbonation process, also known as mineralization of the carbon dioxide into calcium carbonate, occurs naturally at the surface of cementitious structures when the calcium hydroxide formed during hydration of cementitious materials combines with environmentally available carbon dioxide and produces calcium carbonate.

Importantly, the absorption of carbon dioxide by concrete over time is influenced by the level of ambient carbon dioxide, the distance from the surface, and the diffusion properties of concrete. The equation that governs this process is described by Fick's second law of diffusion which states:

$$\partial C / \partial t = D * \left( \partial^2 C / \partial x^2 \right)$$

where $\partial C / \partial t$ is the rate of change of carbon dioxide concentration over time, D is the diffusion coefficient of carbon dioxide in concrete, and $\partial^2 C / \partial x^2$ is the second derivative of carbon dioxide concentration with respect to distance from the surface.

As a result, in typical concrete, carbonation most occurs at the surface exposed to the external environment and ceases as the chemical process seeps deeper into the material. In concrete with cracks that expose too much of the concrete to carbon dioxide, an unwelcome chalk-like substance may appear on the surface of the wall system. The excess carbonation near the surface may also occur as a result of current processes which sequester carbon dioxide uniformly throughout the wall system because the environmental carbon dioxide supplements the carbon dioxide bubbles that have been sequestered near the surface. In order to maximize the benefits of entraining carbon dioxide in a wall system, there is a need to have a limited amount of carbon dioxide near the surface of newly placed cementitious walls, while also progressively increasing the amount of carbon dioxide captured near the center of the wall system. Prior to the present disclosure, no mechanism existed to overcome this optimization problem.

Most current approaches do not intentionally or adequately sequester carbon dioxide in cementitious walls systems and thus rely only on ambient absorption. But, when approaches are used to capture carbon dioxide in a wall system, they sub-optimally capture the gas with a generally uniform density across either a portion of the wall system or the entirety of the wall system. The former, more typical process "under captures" carbon dioxide, limiting potential carbonation, while the latter process can "over capture" carbon dioxide and suffer the adverse effect of excess carbonation at the surface.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is a novel approach to the creation of wall systems, that, unlike existing methods of creating wall systems, does not create distinct layers of differing densities and controls the density gradient of the final material. Rather, the disclosed systems and methods include a generally continuous density gradient transitioning from one side of a cementitious printed wall to another. When carbon dioxide is used in this manner, additional benefits are obtained that are otherwise not available today.

Specifically, the disclosed systems and methods of using 3D printing allows structures to be built in ways not before imagined that can solve the problem with existing systems creating such distinct layers of differing densities, improve the bonding, reduce the delamination of differing materials, and create optimal density gradients across a wall structure.

Described herein is a mixing nozzle assembly comprising: a deposition material inlet sized and shaped to receive a pressurized flow of deposition material; at least one deposition material chute having a first end and an opposing second end, each of said at least one deposition material chutes being in fluid communication with said deposition material inlet at said first end to receive at least some of said pressurized flow of deposition material; a gaseous bubble mix inlet; and a mixing chamber, said mixing chamber in fluid communication with each of said at least one deposition material chutes at said second end, and said mixing chamber in fluid communication with said gaseous bubble mix inlet and receiving an expanded pressurized bubble-deposition mixture that at least partially combines with said pressurized flow of deposition material received from said at least one deposition material chute in said mixing chamber, and said mixing chamber having at least one obstructing element disposed therein.

In an embodiment, the expanded pressurized bubble-deposition mixture of the mixing nozzle assembly is received in said mixing chamber from said gaseous bubble mix inlet.

In an embodiment, the gaseous bubble mix inlet comprises a spray nozzle sized and shaped to receive a flow of pressurized gaseous bubble mix.

In an embodiment, the mixing nozzle assembly further comprises: a gaseous mixing chamber having a first end and an opposing second end, said first end of said gaseous mixing chamber in fluid communication with said deposition material inlet to receive at least some of said pressurized flow of deposition material, and in fluid communication with said spray nozzle to receive a pressurized flow of gaseous bubble mix, wherein said pressurized flow of deposition material and said pressurized flow of gaseous bubble mix combine in said gaseous mixing chamber to form a pressurized bubble-deposition mixture.

In an embodiment, the mixing nozzle assembly further comprises: an expansion chamber in fluid communication with said gaseous mixing chamber to receive to receive said pressurized bubble-deposition mixture from said gaseous mixture chamber, where said pressurized bubble-deposition mixture expands in said expansion chamber to form said expanded pressurized bubble-deposition mixture.

In an embodiment, the mixing chamber is in fluid communication with said expansion chamber to receive said expanded pressurized bubble-deposition mixture from said expansion chamber.

In an embodiment, the deposition material inlet is in pressurized fluid communication with a deposition material pump system.

In an embodiment, the deposition material comprises a cementitious material or mortar.

In an embodiment, the cementitious material or mortar further comprises at least one accelerant.

In an embodiment, the gaseous bubble mix spray nozzle is in pressurized fluid communication with a source of gaseous bubble mix.

In an embodiment, the gaseous bubble mix comprises carbon dioxide.

In an embodiment, the gaseous bubble mix comprises greater than 10% carbon dioxide.

In an embodiment, the at least one deposition material chute comprises two deposition material chutes each disposed on opposing sides of said gaseous mixing chamber.

In an embodiment, the two deposition material chutes are disposed on opposing sides of said expansion chamber.

In an embodiment, the at least one obstructing element is monolithically constructed with said mixing chamber.

In an embodiment, the at least one obstructing element comprises a plurality of vanes sized, shaped, and disposed in said mixing chamber to cause deposition material received in said mixing chamber from said two deposition material chutes to form fluid eddies around said vanes.

In an embodiment, the fluid eddies are effective to cause said expanded pressurized bubble-deposition mixture combined in said mixing chamber with said pressurized flow of deposition material received from said two deposition material chutes to have a generally uniform density gradient.

In an embodiment, the generally uniform density gradient has a low density section at a midpoint and high density sections at the edges.

In an embodiment, the plurality of vanes comprise cylindrical pins disposed in said mixing chamber generally perpendicular to the flow of deposition material.

In an embodiment, the plurality of vanes comprise cylindrical pins disposed in said mixing chamber at an angle of 15 degrees relative to a plane perpendicular to the flow of deposition material.

In an embodiment, the two deposition material chutes are sized and shaped such that each such chute receives about 40% of the deposition material from said deposition material inlet.

In an embodiment, the first ends of said two deposition material chutes are sized and shaped effectively to cause said at least some of said pressurized flow of deposition material received by each of said two deposition material chutes from said deposition material inlet to comprise about 40% of the deposition material received by said deposition material inlet.

DESCRIPTION OF THE PREFERRED EMBODIMENT(S)

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

Described herein, among other things, is a system and method to control and limit the amount of entrained carbon dioxide near the surface where the natural, ambient carbonation will occur over time, and a structural three-dimensional printing system used to control the density gradient through the cross-section of a wall system. Simultaneously, this disclosure steadily increases the amount of carbon dioxide captured in the middle of the wall system where it would not be absorbed normally. This delicate balance can be achieved through proper control of the density gradient of carbon dioxide when used as disclosed herein.

It should be understood that a "density gradient" refers to a gradual change in density across a specific region or material. It represents a variation in the distribution of mass or substance per unit volume. A continuously variable density across a material can offer significant material property improvements compared to a material with a small number of distinct layers.

In surmounting the disadvantages of the prior art, the present disclosure provides a controlled and repeatable density gradient profile across each 3D printed layer of the wall system section.

Figure 1:
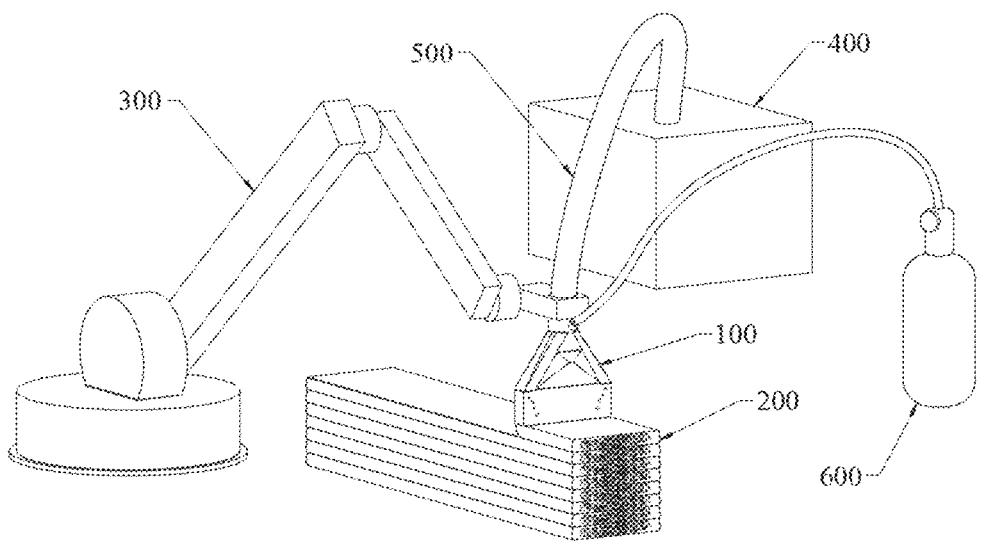
FIG. 1 depicts a robotic 3D printing system in accordance with the present disclosure.
Figure 2:
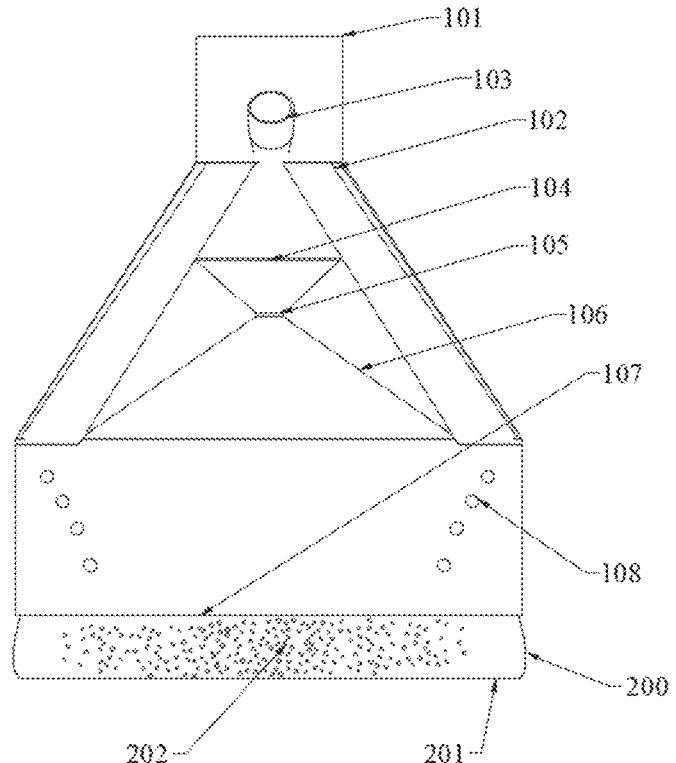
FIG. 2 depicts a cross sectional diagram of the system of FIG. 1.
Figure 3:
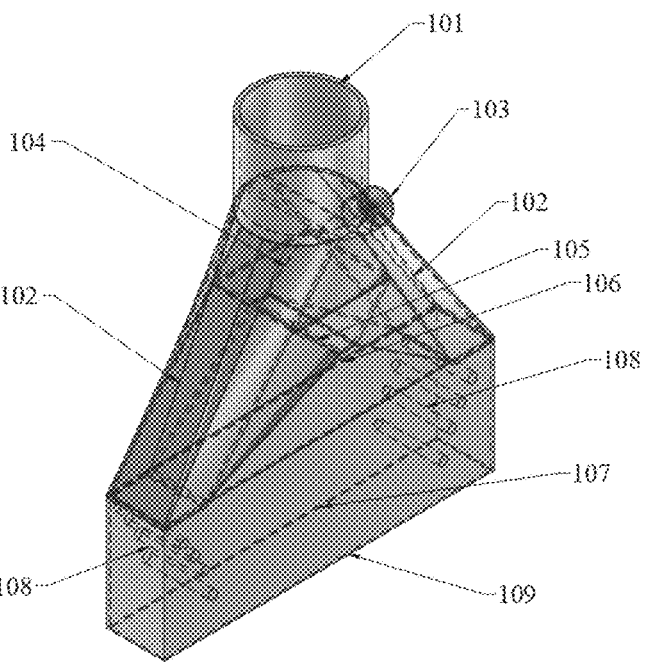
FIG. 3 depicts an isometric view of the system of FIG. 1.

FIGS. 1-3 depict exemplary, non-limiting examples of embodiments of the disclosed systems and methods. The 3D printing system of the present disclosure generally comprises a robot system (300), a 3D printing head (100), and a mortar pump system (400). The depicted robot (300) is equipped with one embodiment of the present disclosure (100) and fed with a cementitious material or mortar from a pump system (400) and supplemented with gaseous bubbles (600) which include both a surfactant and an accelerator. The robot system (300) may take one of many forms including a gantry system, a robotic arm system, or the like. The mortar pump system (400) may take the form of progressive cavity pump, a piston pump, or other pumps used in structural 3D printing. The mortar material pumped through the line (500) may be one of a variety of cementitious mixes available commercially for structural 3D printing, or it may be mixed on site typically containing fine sand and portland cement and may include an accelerator and a water reducer, all mixed with water as is well known to those skilled in the art. The gaseous bubble system (600) may contain compressed ambient air or a specific gas such as carbon dioxide, either of which is mixed with one of many commercially available surfactants and an accelerator such as aluminum hydroxide or another aluminum or calcium salt also well known in the art.

The term "cementitious material" or "mortar" should be taken to include any agglomeration of filler(s) and binder(s) that can be conveyed in a fluid state and then hardened after deposition. The term "accelerator" should be taken to include any material that is capable of accelerating, via catalytic or other processes, the curing/setting of cementitious material.

In a preferred embodiment, a multi-section mixing nozzle (100) is utilized to generate a density gradient within each 3D printed layer of a wall system (200). A mortar material is fed into the inlet (101) and is split in three ways with the majority of the material being equally divided into two separate chutes (102) which flow down the sides of the nozzle before entering the mixing chamber (107). In one embodiment, both chutes (102) are configured such that the cross sectional volume from the inlet (101) to the mixing section (107) of the mechanism is constant.

A portion of the material is fed through the center of the inlet and combined with a pressurized gaseous bubble mix (600) through a spray nozzle (103) into a gaseous mixing chamber (104). The gas flow rate can be controlled to ensure that the mortar to gas ratio in the resultant material is precisely as desired.

Figure 4:
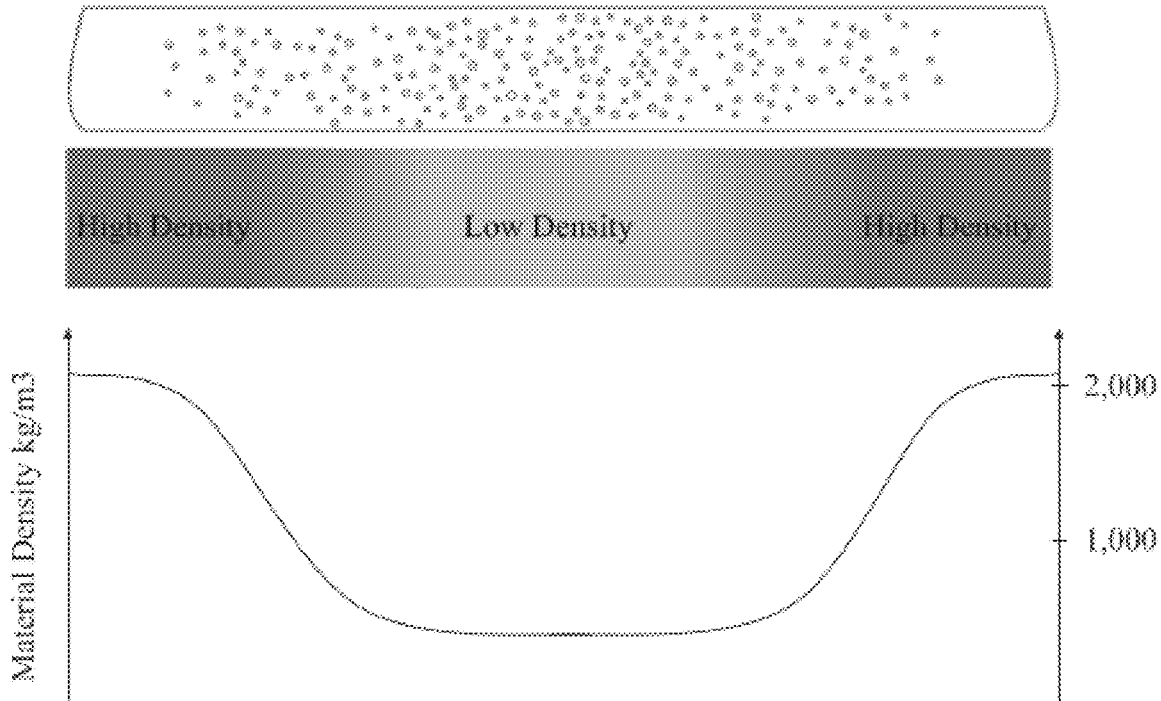
FIG. 4 depicts the material density of a wall system produced in accordance with the present disclosure.

The resulting printed product (200) is captured in FIG. 4 as made with the present disclosure. On the outer edges of the wall system there are almost no gaseous bubbles resulting in a high density material while the center of the wall system has many gaseous bubbles resulting in a low density material. Across the wall system there is a smooth transition from high density (with low gas capture) on both exteriors to lower density (with high gas capture) on the interior.

While a variety of widths and portions may be used, one example of the mechanism (100) uses a 50 mm mortar hose which initially splits the material into approximately 40%, 20%, and 40% volumes for flow into a first chute (102) a bubble mix section (104) and a second chute (102). The eventual wall system extruded from the outlet (109) is approximately 200 mm wide with a deposition height and outlet width of 20-25 mm. The smallest portion, 20% in this example, of the mortar coming through the center inlet mixes with the gaseous bubbles in the mix section (104) into a relatively uniform bubble-mortar mix which then flows through an orifice (105) and into an expansion chamber (106). The material from the chutes (102) and the bubble-mortar mixture for the expansion chamber (106) are fed into the mixing chamber (107).

Within the mixing chamber (107) are one or more vane-like obstructions (108) placed to interrupt the flow of the material coming from the side chutes (102) to mix it with the mortar bubble mix. The obstructions (108) may be simple pins of a diameter between 2 mm and 10 mm or they may be thin plates with a thickness between 1 mm and 10 mm. Other widths and dimensions may be used, as well as any number of vane like pins or obstructions to obtain a desired density gradient, but one effective combination may be two, 2 mm by 10 mm plates set at approximately one-third and two-thirds of the width of the chute (102) at a slight angle, approximately 15 degrees, with the centermost vane placed about 10 mm below the outermost vane. Because both the chutes (102) and the expansion chamber (106) are pressurized, the cementitious material will split and mix, forming eddies around the vanes (108) which produces a relatively uniform density gradient from one side to the other side of the output (109). Because the mortar/bubble mix may have additional accelerators mixed into it, the surface will be hard enough to support the next layer within a few minutes, depending on the level of accelerator, as is required for structural 3D printing.

Figure 5A:
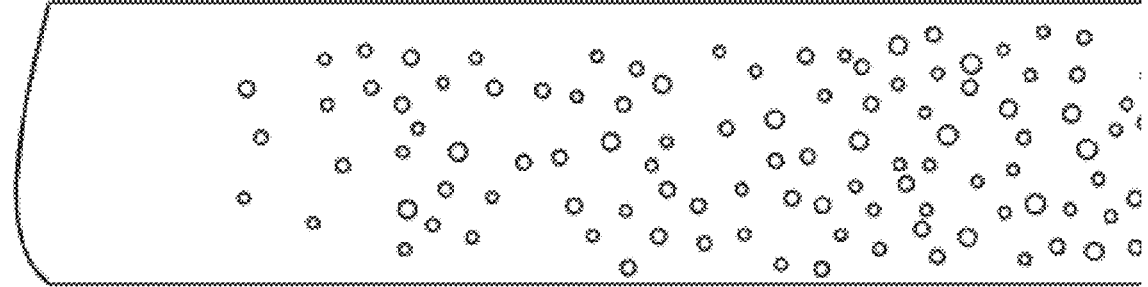
FIG. 5A depicts a half-wall section produced in accordance with the present disclosure.
Figure 5B:
FIG. 5B is a photo of a density gradient made with 3D print material.

FIGS. 5A and 5B shows a close up cross section of a portion of a wall system per the present disclosure. FIG. 5A shows the theoretical depiction of the gaseous bubbles increasing in occurrence from left to right. FIG. 5B is a sample made with 3D printed material. Both have almost no gaseous bubbles on the left edge of the wall section and slowly transition to a high concentration of gaseous bubbles on the right.

In another embodiment, distinct inlet nozzles provide either a high density cementitious mixture or a lower density bubble/mortar mixture directly into the mixing chamber (107) prior to deposition through the outlet (109).

In another embodiment, the gaseous mixture (600) is primarily composed of carbon dioxide. Carbon dioxide may come from industrial-scale carbon dioxide sources, such as carbon capture and utilization (CCU) processes. Besides a primary function of sequestering carbon dioxide in the encapsulated bubble mortar mix, a controlled density gradient of carbon dioxide impacts both the chemical reaction in concrete known as carbonation as well as the final products' material properties.

Figure 6:
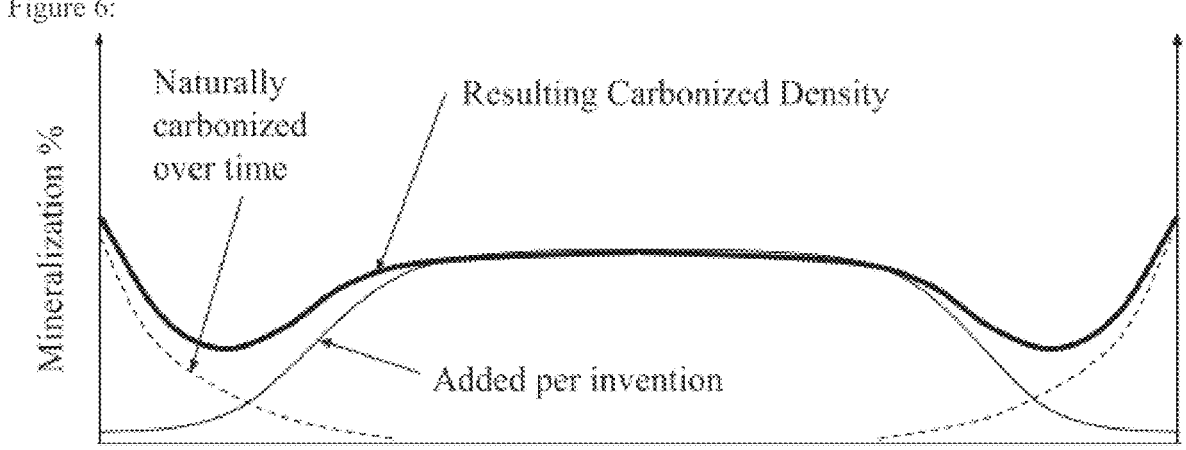
FIG. 6 depicts the eventual mineralization due to carbon dioxide density gradient across a wall system produced in accordance with the present disclosure.

FIG. 6 captures a depiction of the eventual mineralization due to the carbon dioxide density gradient across a wall system made with the present disclosure. The resulting gradient may be modified through adjustments to the mechanism. In order to balance the transition of the space near the surface so as to maximize the overall sequestration of carbon dioxide without entraining so much as to adversely affect the structural integrity and strength of the wall system.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present disclosure. Modifications and variations of the described embodiments may be made without departing from the spirit and scope of the invention.

It will further be understood that any of the ranges, values, properties, or characteristics given for any single component of the present disclosure may be used interchangeably with any ranges, values, properties, or characteristics given for any of the other components of the disclosure, where compatible, to form an embodiment having defined values for each of the components, as given herein throughout. Further, ranges provided for a genus or a category may also be applied to species within the genus or members of the category unless otherwise noted.

Finally, the qualifier "generally," and similar qualifiers as used in the present case, would be understood by one of ordinary skill in the art to accommodate recognizable attempts to conform a device to the qualified term, which may nevertheless fall short of doing so. This is because terms such as "circular" are purely geometric constructs and no real-world component is a true "circular" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally" and relationships contemplated herein regardless of the inclusion of such qualifiers to include a range of variations from the literal geometric meaning of the term in view of these and other considerations.

The invention claimed is:

1. A mixing nozzle assembly comprising:
   a deposition material inlet sized and shaped to receive a pressurized flow of deposition material;
   at least one deposition material chute having a first end and an opposing second end, each of said at least one deposition material chutes being in fluid communication with said deposition material inlet at said first end to receive at least some of said pressurized flow of deposition material;
   a gaseous bubble mix inlet; and
   a mixing chamber, said mixing chamber in fluid communication with each of said at least one deposition material chutes at said second end, and said mixing chamber in fluid communication with said gaseous bubble mix inlet and receiving an expanded pressurized bubble-deposition mixture that at least partially combines with said pressurized flow of deposition material received from said at least one deposition material chute in said mixing chamber, and said mixing chamber having at least one obstructing element disposed therein.

2. The mixing nozzle assembly of claim 1, wherein said expanded pressurized bubble-deposition mixture is received in said mixing chamber from said gaseous bubble mix inlet.

3. The mixing nozzle assembly of claim 1, wherein said gaseous bubble mix inlet comprises a spray nozzle sized and shaped to receive a flow of pressurized gaseous bubble mix.

4. The mixing nozzle assembly of claim 3, further comprising:
   a gaseous mixing chamber having a first end and an opposing second end, said first end of said gaseous mixing chamber in fluid communication with said deposition material inlet to receive at least some of said pressurized flow of deposition material, and in fluid communication with said spray nozzle to receive a pressurized flow of gaseous bubble mix, wherein said pressurized flow of deposition material and said pressurized flow of gaseous bubble mix combine in said gaseous mixing chamber to form a pressurized bubble-deposition mixture.

5. The mixing nozzle assembly of claim 4, further comprising:
   an expansion chamber in fluid communication with said gaseous mixing chamber to receive said pressurized bubble-deposition mixture said gaseous mixing chamber, where said pressurized bubble-deposition mixture expands in said expansion chamber to form said expanded pressurized bubble-deposition mixture.

6. The mixing nozzle assembly of claim 5, wherein said mixing chamber is in fluid communication with said expansion chamber to receive said expanded pressurized bubble-deposition mixture from said expansion chamber.

7. The mixing nozzle assembly of claim 1, wherein said deposition material inlet is in pressurized fluid communication with a deposition material pump system.

8. The mixing nozzle assembly of claim 1, wherein said deposition material comprises a cementitious material or mortar.

9. The mixing nozzle assembly of claim 8, wherein said cementitious material or mortar further comprises at least one accelerant.

10. The mixing nozzle assembly of claim 1, wherein said gaseous bubble mix spray nozzle is in pressurized fluid communication with a source of gaseous bubble mix.

11. The mixing nozzle assembly of claim 1, wherein said gaseous bubble mix comprises carbon dioxide.

12. The mixing nozzle assembly of claim 11, wherein said gaseous bubble mix comprises greater than 10% carbon dioxide.

13. The mixing nozzle assembly of claim 5, wherein said at least one deposition material chute comprises two deposition material chutes each disposed on opposing sides of said gaseous mixing chamber.

14. The mixing nozzle assembly of claim 13, wherein said two deposition material chutes are disposed on opposing sides of said expansion chamber.

15. The mixing nozzle assembly of claim 14, wherein said at least one obstructing element is monolithically constructed with said mixing chamber.

16. The mixing nozzle assembly of claim 15, wherein said at least one obstructing element comprises a plurality of vanes sized, shaped, and disposed in said mixing chamber to cause deposition material received in said mixing chamber from said two deposition material chutes to form fluid eddies around said vanes.

17. The mixing nozzle assembly of claim 16, wherein said fluid eddies are effective to cause said expanded pressurized bubble-deposition mixture combined in said mixing chamber with said pressurized flow of deposition material received from said two deposition material chutes to have a generally uniform density gradient.

18. The mixing nozzle assembly of claim 17, wherein said generally uniform density gradient has a low density section at a midpoint and high density sections at edges.

19. The mixing nozzle assembly of claim 16, wherein said plurality of vanes comprise cylindrical pins disposed in said mixing chamber generally perpendicular to the flow of deposition material.

20. The mixing nozzle assembly of claim 16, wherein said plurality of vanes comprise cylindrical pins disposed in said mixing chamber at an angle of 15 degrees relative to a plane perpendicular to the flow of deposition material.

21. The mixing nozzle assembly of claim 13, wherein said two deposition material chutes are sized and shaped such that each such chute receives about 40% of the deposition material from said deposition material inlet.

22. The mixing nozzle assembly of claim 13, wherein said first ends of said two deposition material chutes are sized and shaped effectively to cause said at least some of said pressurized flow of deposition material received by each of said two deposition material chutes from said deposition material inlet to comprise about 40% of the deposition material received by said deposition material inlet.

* * * * *